(12) United States Patent
Chen

(10) Patent No.: US 6,532,890 B2
(45) Date of Patent: Mar. 18, 2003

(54) SPEED INDICATOR FOR A SHIFTING DEVICE OF BICYCLE

(75) Inventor: Chieh-Yuan Chen, Taichung Hsien (TW)

(73) Assignee: Ad-II Engineering Inc., Taichung Hsien (TW)

( * ) Notice: Subject to any disclaimer, the term of this patent is extended or adjusted under 35 U.S.C. 154(b) by 0 days.

(21) Appl. No.: 09/879,977

(22) Filed: Jun. 14, 2001

(65) Prior Publication Data

US 2002/0189524 A1 Dec. 19, 2002

(51) Int. Cl.[7] .............................................. F16C 1/10
(52) U.S. Cl. ..................................... 116/28.1; 74/502.2
(58) Field of Search ........................... 116/28.1, 284, 116/309, 281, 282; 74/502.2, 501.6, 500.5

(56) References Cited

U.S. PATENT DOCUMENTS

| | | | | |
|---|---|---|---|---|
| 4,055,093 A | * | 10/1977 | Ross ......................... | 74/501 R |
| 5,601,001 A | * | 2/1997 | Kawakami et al. ........ | 74/502.2 |
| 5,701,786 A | * | 12/1997 | Kawakami ................. | 74/502.2 |
| 6,276,277 B1 | * | 8/2001 | Ose ............................ | 74/489 |

* cited by examiner

Primary Examiner—Diego Gutierrez
Assistant Examiner—Tania C. Courson
(74) Attorney, Agent, or Firm—Bacon & Thomas, PLLC

(57) ABSTRACT

A speed indicator for a shifting device of bicycle. The speed indicator is operated by a shifting device which has an arresting face. The speed indicator includes a housing disposed on the bicycle handlebar and provided with a slide portion. A rotating member is pivoted with the housing and provided at one end with a first long hole and at other end with a second long hole. An actuation set is disposed slidably on the housing and provided with an urging rod urged by an elastic member to press against the arresting face of the shifting device. A guide pin is inserted into the first long hole of the rotating member. A display member is disposed slidably in the slide portion of the housing and provided with a guide pin which is inserted into the second long hole of the rotating member. As the shifting device is turned to shift gear, the arresting face urges the actuation set member.

6 Claims, 3 Drawing Sheets

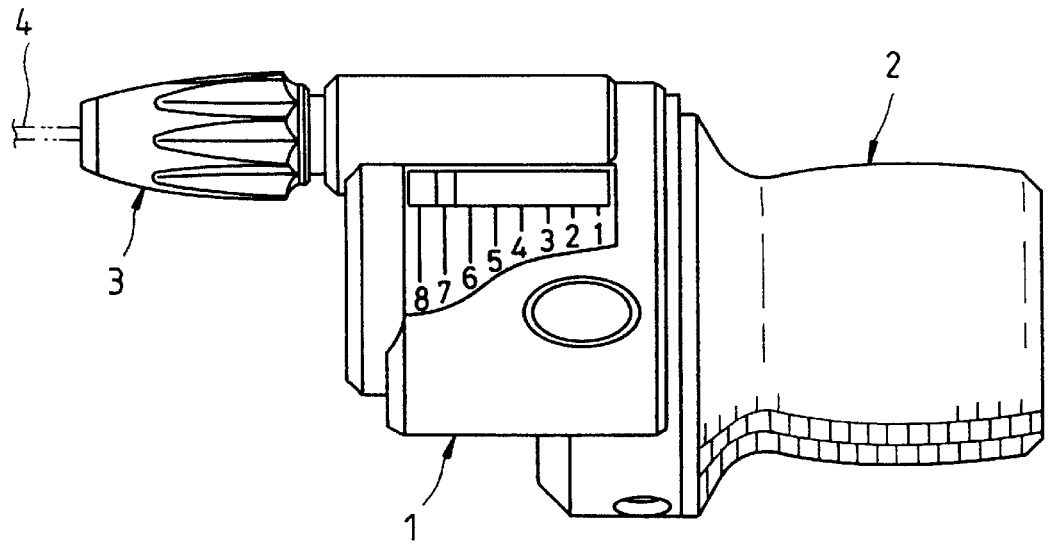
FIG.1
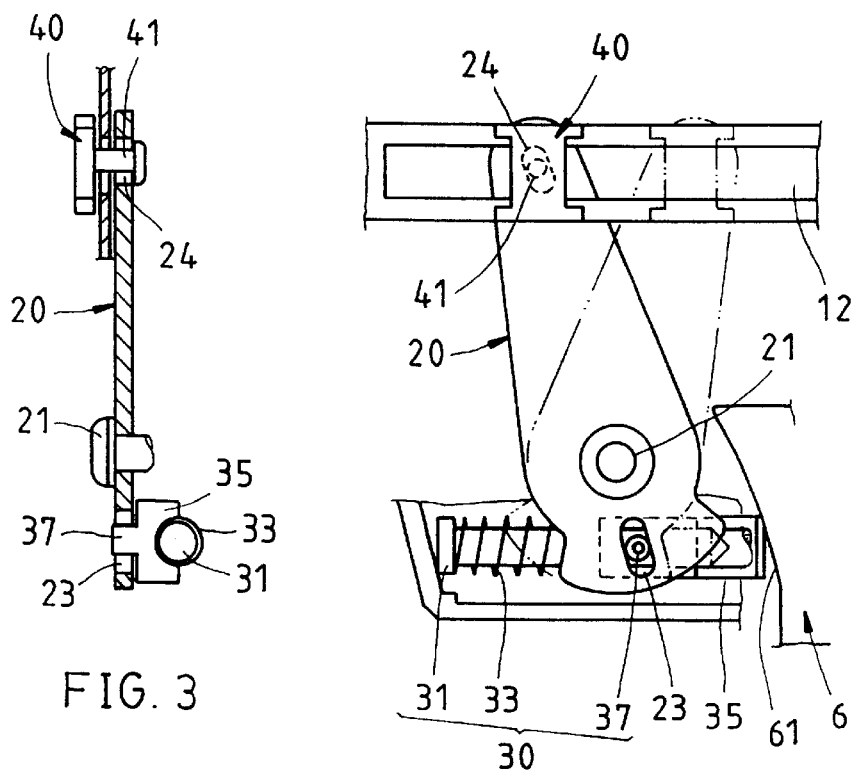
FIG.3
FIG.4

SPEED INDICATOR FOR A SHIFTING DEVICE OF BICYCLE

FIELD OF THE INVENTION

The present invention relates generally to a bicycle, and more particularly to a speed indicator for a shifting device of the bicycle.

BACKGROUND OF THE INVENTION

The displaying of the conventional speed indicator is attained by printing the gear numbers on the housing. The gear numbers printed on the housing are apt to fade or wear out by friction. Such a displaying means as described above is primitive at best.

There is another conventional means to indicate the speed of a bicycle. The display is so small that a bicyclist can hardly see the gear numbers. Certain display has a greater size; nevertheless it is rather complicated in construction and is not cost-effective.

SUMMARY OF THE INVENTION

It is the primary objective of the present invention to provide a speed indicator for a shifting device of bicycle which is user-friendly.

It is another objective of the present invention to provide a speed indicator for a shifting device of bicycle which is simple in construction and cost-effective.

It is still another objective of the present invention to provide a speed indicator for a shifting device of bicycle which is applicable to a variety of shifting devices.

The speed indicator of the present invention is mounted on the handlebar of a bicycle and is provided with a shifting device which has an arresting face. The speed indicator comprises a housing mounted on the bicycle handlebar and provided with a slide portion and a window; a rotating member pivoted on the housing and provided at one end with a first long hole and at other end with a second long hole; an actuation set slidably disposed in the housing, an urging rod which is urged by a spring to press against the arresting face of the shifting device, and provided with a guide pin is inserted into the first long hole of the rotating member; a display member is slidably disposed in the slide portion of the housing and provided with a guide pin is inserted into the second long hole of the rotating member.

The shifting is done by operating the shifting device. The arresting face of the shifting device urges the actuation member to displace, thereby actuating the rotating member to turn so as to link the display member to slide in the slide portion to indicate the gear transmission.

The slide portion of the housing is preferably a slide slot. The housing is preferably further provided with a cover. And the elastic member of the actuation set is preferably a spring.

BRIEF DESCRIPTION OF THE DRAWINGS

FIG. 1 shows a plan view of a preferred embodiment of the present invention in combination.

FIG. 3 shows a right sectional view of the rotating member of the present invention.

FIG. 4 is a top sectional view of the actuation member of the present invention to show the action of the shifting.

DETAILED DESCRIPTION OF THE INVENTION

As shown in FIG. 1, a speed indicator embodied in the present invention is mounted on a bicycle handlebar. The speed indicator 1 is assembled with a shifting device 2 and at other end with an adjustment button 3, and a control cable 4.

Figure 2:
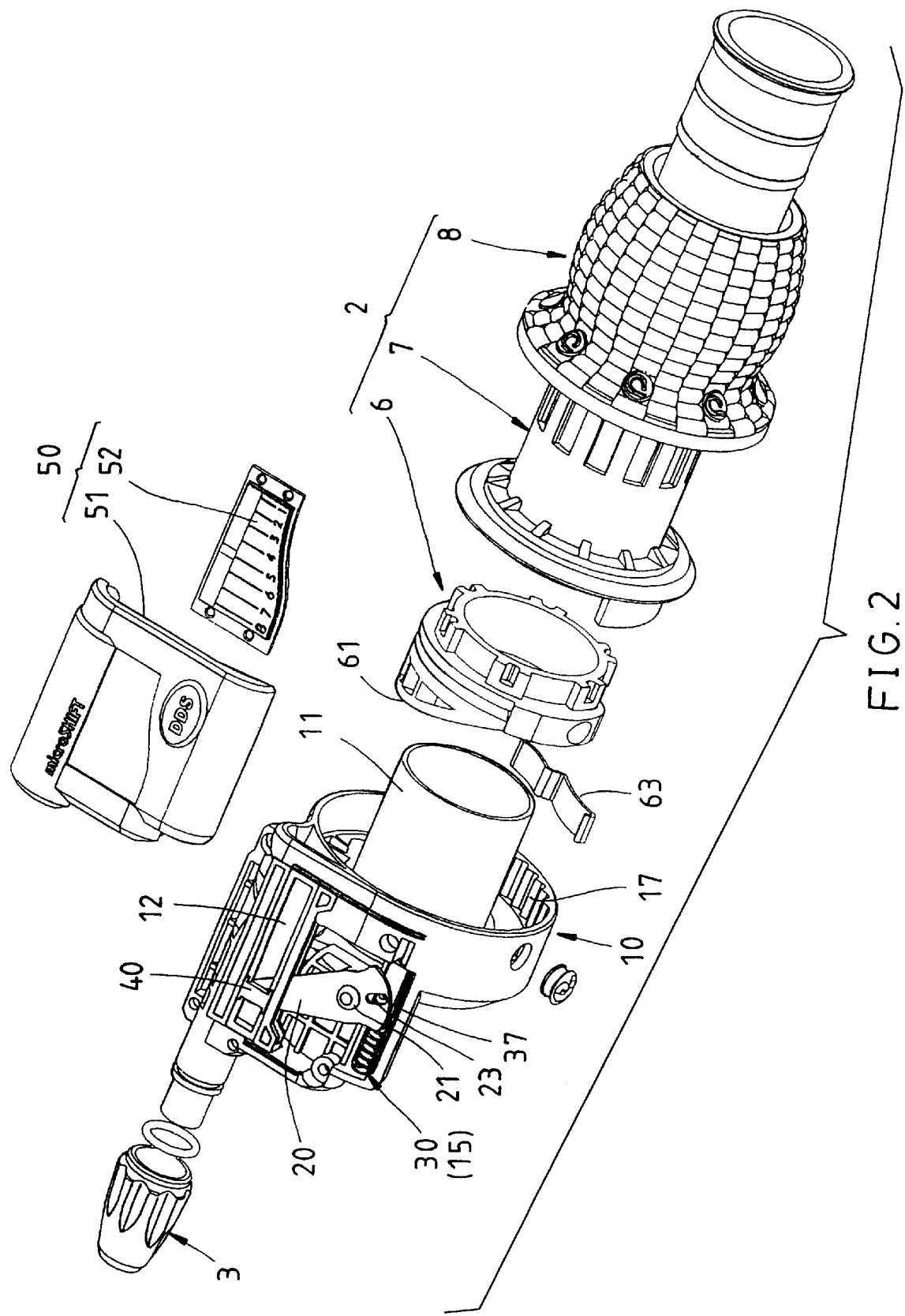
FIG. 2 shows an exploded view of the preferred embodiment of the present invention.
Figure 5:
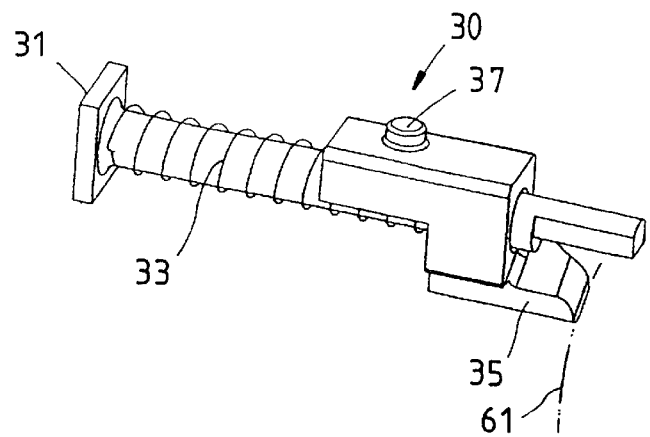
FIG. 5 shows a perspective view of the actuation member of the preferred embodiment of the present invention.

As shown in FIG. 2, the shifting device 2 is formed of a cable wheel 6, a sleeve 7, and a rotary sleeve 8. The cable wheel 6 is provided with an arresting face 61 and a locating piece 63. The cable wheel 6 is connected with the control cable 4.

As shown in FIGS. 2–5, the speed indicator 1 comprises a housing 10, a rotating member 20, an actuation set 30, a display member 40, and a cover 50.

The housing 10 has a shaft tube 11 fitted with the handlebar, a slide slot 12 is of a linear construction disposed on the top thereof, an inner hole 15 is disposed at a lower position thereof, and includes a plurality of retaining portions 17 for retaining the locating piece 63 of the cable wheel 6.

The rotating member 20 is pivoted with the housing 10 and has a pivot 21 corresponding to the housing 10, a first long hole 23 disposed at the lower end, a second long hole 24 disposed at other end.

The actuation set 30 has a fixation shaft 31 disposed in the interior of the housing 10, an elastic member or spring 33 and an urging rod 35 fitted with the fixation shaft 31, and the urging rod 35 provided with a guide pin 37 movably inserted into the first long hole 23 of the rotating member 20. The urging rod 35 is urged at the right side end by the arresting face 61 of the cable wheel 6.

The display member 40 is disposed in the slide slot 12 of the housing 10, with the upper and the lower sides thereof retaining the upper and the lower end edges of the slide slot 12. A guide pin 41 is movably disposed in the second long hole 24 of the rotating member 20 to slide freely in the slide slot 12 of the housing 10.

The cover 50 is disposed on the housing 10 and is provided with a shell 51 corresponding to the upper opening of the slide slot 12 of the housing 10, and a window 52 marked with numerals indicative of the gear transmission.

In shifting operation, the rotary sleeve 8 is turned with hand, so as to actuate the cable wheel 6 to turn. The control cable 4 is thus pulled. The cable wheel 6 is turned. As a result, the shifting device 2 is in action. But the construction and action of the shifting device 2 is not a subject matter of the present invention.

As shown in FIGS. 3–4, the urging rod 35 of the actuation set 30 is exerted on by the spring force of the spring 33 to urge movably the arresting face 61 of the cable wheel 6. In light of the arresting face 61 of the cable wheel 6 being tilted, the actuation set 30 displaces linearly and horizontally.

The guide pin 37 of the actuation set 30 actuates the first long hole 23 of the rotating member 20 to turn. As a result, the second long hole 24 of the rotating member 20 pulls the guide pin 41 of the display member 40, thereby actuating the display member 40 to move in the slide slot 12 of the housing 10 so as to indicate the position on the window 52 of the cover 50 as to the gear change.

On the other hand, the slide slot of the housing may be arcuate to enable the display member to slide in the slide slot of the housing to indicate the gear transmission in action.

And the guide pins 37, 41 of the actuation set and the display member of the present invention are provided with a rolling collar (not shown in the drawing) capable of rotating freely to each other.

Figure 6:
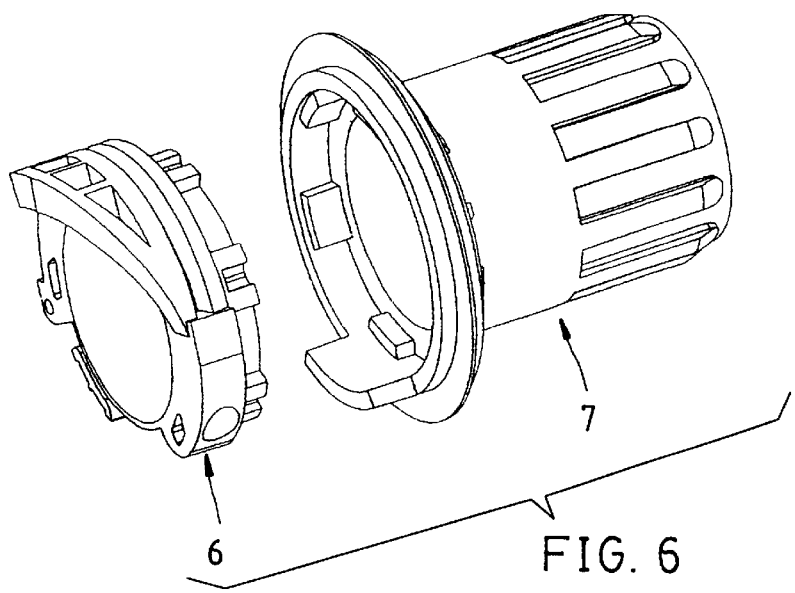
FIG. 6 shows an exploded view of the cable wheel and the sleeve of the preferred embodiment of the present invention.
Figure 7:
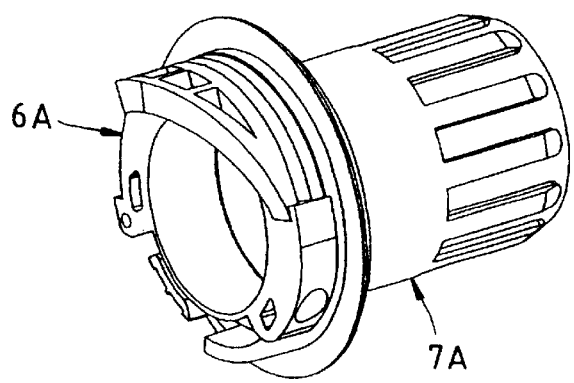
FIG. 7 shows a perspective view of another kind of cooperating cable wheel and the sleeve of the present invention.

As shown in FIG. 6, the cable wheel 6 and the sleeve 7 are to be joined together. As shown in FIG. 7, the cable wheel 6A and the sleeve 7A are integrally made of a plastic material by injection molding.

The present invention has the following features.

The speed indicator is adapted to various shifting devices, and various display scopes, which can be adjusted to conform to the mechanics of the human body to prevent visional error; the speed indicator is disposed in the shifting device thereby allowing a greater space and a greater display range; and the speed indicator can be of a circumferential or linear design.

What is claimed is:

1. A speed indicator for a shifting device of a bicycle, said speed indicator being mountable on a bicycle handlebar and operated by a shifting device, the shifting device having an arresting face, said speed indicator comprising:

a housing mountable on a bicycle handlebar and provided with a slide portion and a window;

a rotating member pivoted with said housing and provided at one end thereof with a first long hole and at another end thereof with a second long hole;

an actuation set having an urging rod urged by an elastic member and disposed on said housing, said urging rod urging at one end thereof said arresting face of said shifting device, a first guide pin being inserted into said first long hole of the rotating member, the first guide pin connected to the urging rod;

a display member slidably disposed on said slide portion of said housing and provided with a second guide pin which is correspondingly inserted into said second long hole of said rotating member; and said shifting device via the rotation of the arresting face thereof urging said actuation set to displace at such time when said shifting device is turned to gear shift, thereby causing said rotating member to rotate so as to link said display member to slide in said slide portion of said housing to indicate gear transmission.

2. The speed indicator as defined in claim 1, wherein said housing is further provided thereon with a cover.

3. The speed indicator as defined in claim 1, wherein said slide portion of said housing is a slide slot.

4. The speed indicator as defined in claim 3, wherein said slide slot of said housing is of a linear construction.

5. The speed indicator as defined in claim 1, wherein said actuation set is provided with a fixation shaft for disposing movably said elastic member and said urging rod.

6. The speed indicator as defined in claim 1, wherein said elastic member of the actuation set is a spring.

* * * * *